(12) United States Patent
Monot

(10) Patent No.: US 6,253,084 B1
(45) Date of Patent: Jun. 26, 2001

(54) PROCESS AND DEVICE FOR MANAGING INTERCELLULAR TRANSFERS OF RADIO COMMUNICATIONS IN A CELLULAR RADIO COMMUNICATION SYSTEM BY MEASURING VIRTUAL SPEEDS OF CELLULAR DEVICES

(75) Inventor: Jean-Jacques Monot, Courdimanche (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/147,358

(22) PCT Filed: Jun. 6, 1997

(86) PCT No.: PCT/FR97/01006

§ 371 Date: Dec. 31, 1998

§ 102(e) Date: Dec. 31, 1998

(87) PCT Pub. No.: WO97/47150

PCT Pub. Date: Dec. 11, 1997

(30) Foreign Application Priority Data

Jun. 7, 1996 (FR) .................................................. 96 07083

(51) Int. Cl.$^7$ .................................................. H04Q 7/22
(52) U.S. Cl. .................................................. 455/441; 455/444
(58) Field of Search .................................................. 455/440, 441, 455/444, 449, 456, 457; 342/450, 457, 461

(56) References Cited

U.S. PATENT DOCUMENTS

| 5,396,645 | * | 3/1995 | Huff | 455/444 |
| 5,513,380 | * | 4/1996 | Ivanov et al. | 455/444 |
| 5,623,535 | * | 4/1997 | Leung et al. | 455/444 |
| 5,711,005 | * | 1/1998 | Farrag | 455/444 |
| 5,752,168 |   | 5/1998 | Monot et al. . | |
| 5,787,348 | * | 7/1998 | Willey et al. | 455/441 |
| 6,075,993 | * | 6/2000 | Kawamoto | 455/456 |

* cited by examiner

*Primary Examiner*—Edward F. Urban
(74) *Attorney, Agent, or Firm*—Oblon, Spivak, McClelland, Maier & Neustadt, P.C.

(57) ABSTRACT

A process for managing intercellular transfers of communication in a cellular radio communication system. A specified number of microcells inside umbrella cells each respectively possess a base station for allowing the routing of the communications. Radio direction finding is used to pinpoint at least two successive virtual positions of the mobile stations in communication in relation to the base station of the umbrella cell in order to deduce therefrom a speed of movement of each mobile station in the time interval which separates the pinpointing of their positions. The speeds of movement which are obtained are compared to the specified speed values so as to entrust the management of the communication from a mobile station to the base station of the umbrella cell in which it lies when its speed is greater than the specified speed value, or to the base station of the microcells when it is not greater than the specified speed value.

15 Claims, 5 Drawing Sheets

Figure 3:
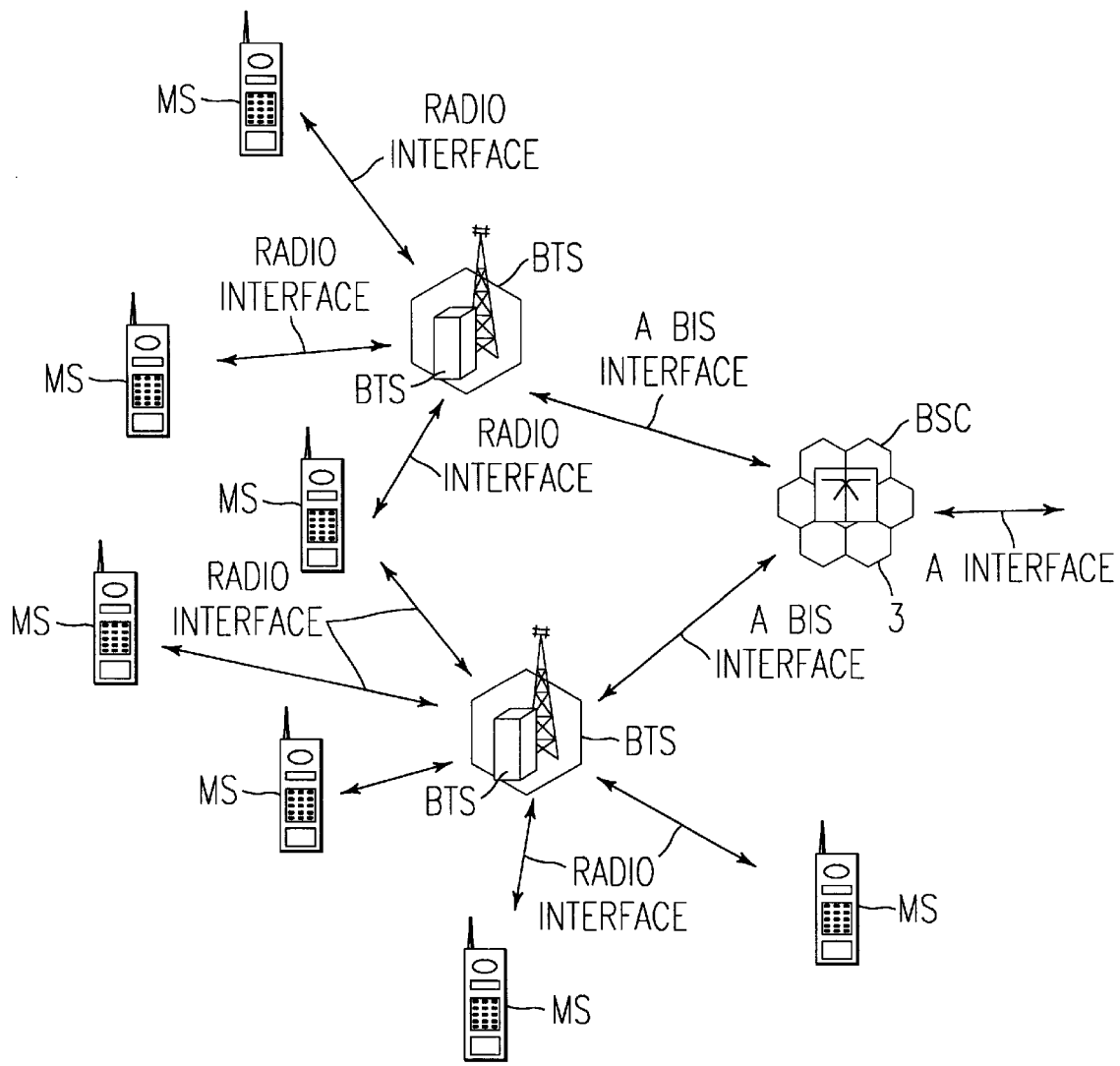

FIG. 1
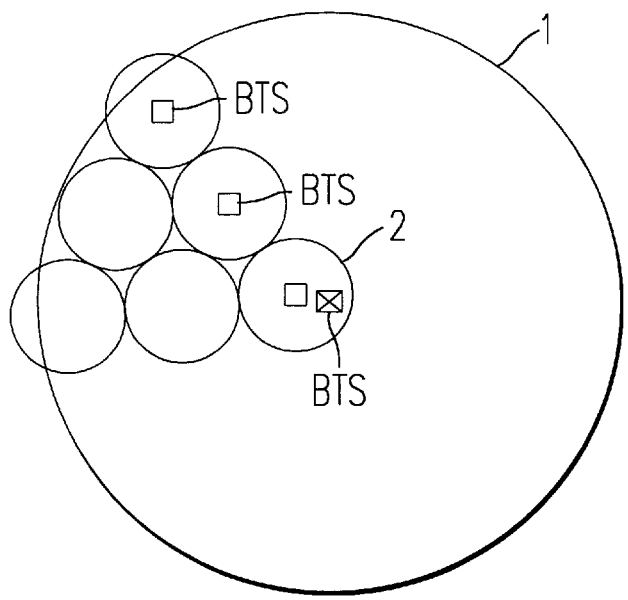
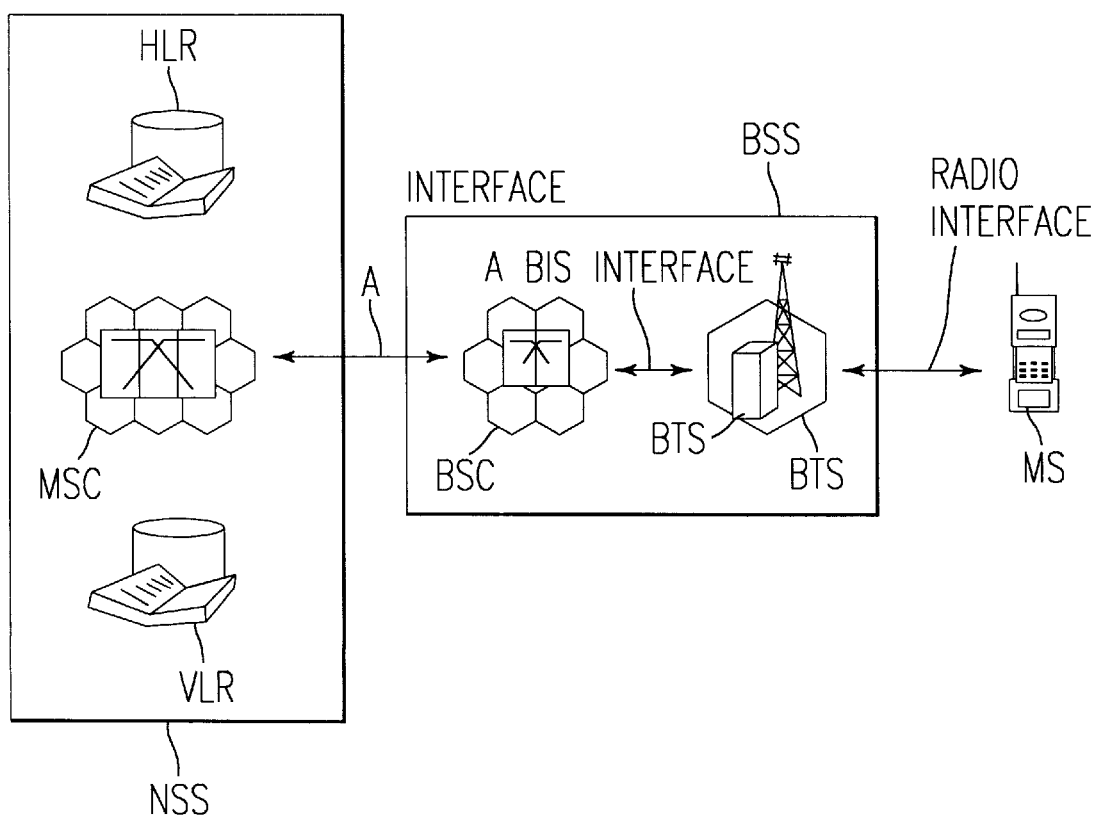
FIG. 2

PROCESS AND DEVICE FOR MANAGING INTERCELLULAR TRANSFERS OF RADIO COMMUNICATIONS IN A CELLULAR RADIO COMMUNICATION SYSTEM BY MEASURING VIRTUAL SPEEDS OF CELLULAR DEVICES

BACKGROUND OF THE INVENTION

1. Field of the Invention

The present invention relates to a process and a device for managing intercellular transfers of communications in a GSM-type cellular radio communication system.

2. Discussion of the Background

It applies in particular to the implementing of cellular radio communication systems in an urban environment in which the density of traffic requires a multitude of cells and consequently a reduction in their size.

In these systems, such as those described, for example in Patent Applications DE-A-4 414 428 and EP-A-0 589 278, the radio coverage of a territory is achieved by using macrocells also termed umbrella cells, each of which encompasses a set of adjoining microcells, each cell possessing a transmit and receive base station. The base station of an umbrella cell is generally arranged at a spot which is high up with respect to the surface of the ground, on the roof of a building for example, and its transmission power is defined so as to enable it to broadcast information in a circular zone whose radius may reach several kilometers. In a different way each transmit/receive base station of a microcell services a zone of small radius which may reach a few hundred meters, and their transmit/receive aerials are generally sited below the level of the roof of buildings, on public lampposts for example.

The umbrella cell makes it possible to absorb the excess traffic appearing in a micro-cell and to manage the gaps in coverage in the micro-cellular deployment. The microcells allow an increase in traffic in a given zone, and make it possible to compensate for coverage hindered by obstacles. However, the construction of microcells of small dimensions gives rise to a complexity in the processing of the transfers of communications between microcells since the more the size of the microcells is reduced, the more it becomes necessary to manage the transfers between cells ever more frequently, and this is all the more so the larger the speed of movement of the mobiles in communication within the cellular network thus formed. This difficulty incurs risks of congestion of the multicellular network which takes a considerable time to manage the signalling signals which accompany each transfer. This difficulty is encountered in particular in GSM mobile radio networks in which no distinction is made between the mobiles in communication, apart from their power class, thus making it difficult to track mobiles in communication so as to offload the communications of the fast mobiles onto the umbrella cell.

SUMMARY OF THE INVENTION

The purpose of the invention is to alleviate the aforesaid drawbacks.

For this purpose, the subject of the invention is a process for managing the intercellular transfer of communications from mobile stations in a cellular radio communication system comprising a specified number of microcells inside umbrella cells each respectively possessing a base station for allowing the routing of the communications, characterized in that it consists, when the station is under the control of a base station of a microcell, in counting the number of transfers $H_0$ performed between microcells by the mobile station during a specified observation interval $T_0$, in calculating a rate of transfer $H_0/T_0$ for performing the transfer of the communications to the umbrella station when the rate of transfer is greater than a specified threshold value, in maintaining the transfer of communications to the base station of the microcell when the rate of transfer is below the specified threshold value and in that it consists, when the mobile station is under the control of an umbrella cell, in using direction finding to measure a virtual speed of movement of the mobile station in relation to the base station of the umbrella cell in such a way as to perform a transfer of the communications to a base station of a microcell when the speed measured by the direction finding is below a specified threshold value.

BRIEF DISCUSSION OF THE DRAWINGS

Figure 4:
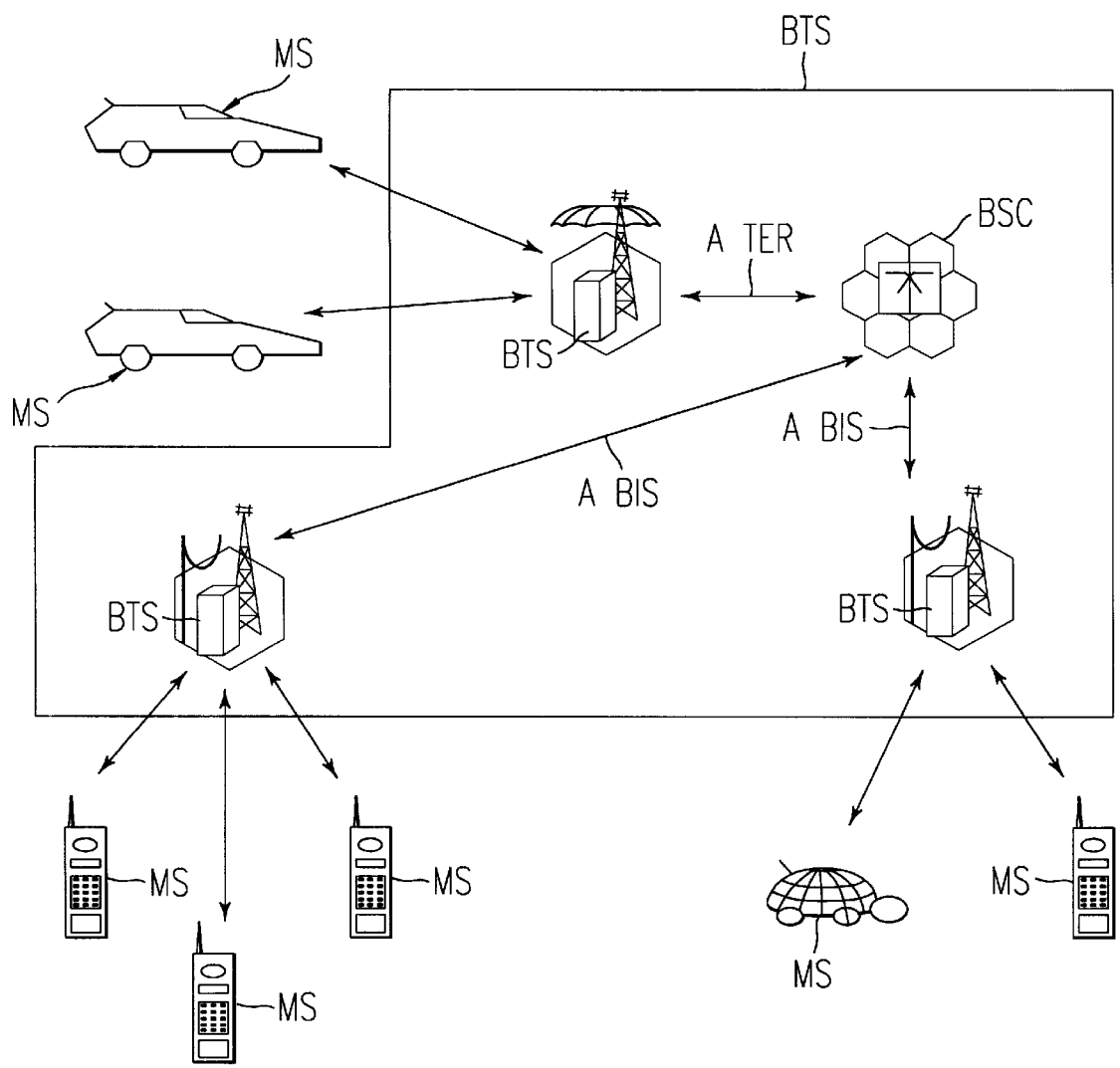
Figure 5:
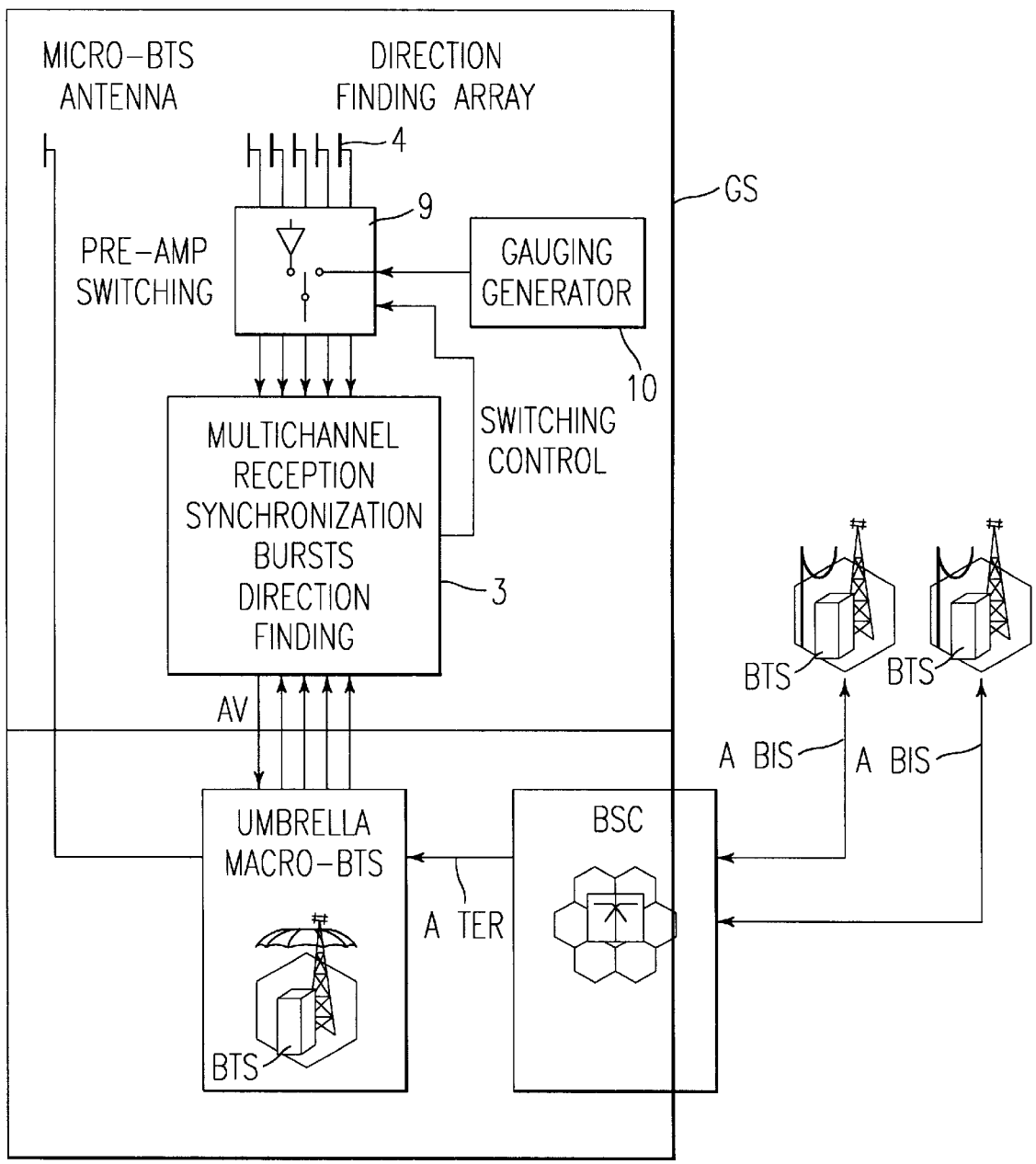

Other characteristics and advantages of the invention will emerge in the description which follows in conjunction with the appended drawings which represent:

FIG. 1, a cellular network structure according to the invention;

FIGS. 2 and 3, diagrams of the functional organization of a GSM network;

FIG. 4, a GSM network incorporating a radio direction finder according to the invention into an umbrella cell;

FIG. 5, an embodiment of a radio direction finder associated with a base station of an umbrella cell for detecting the angle of arrival of the message bursts transmitted by the mobile station.

Figure 6:
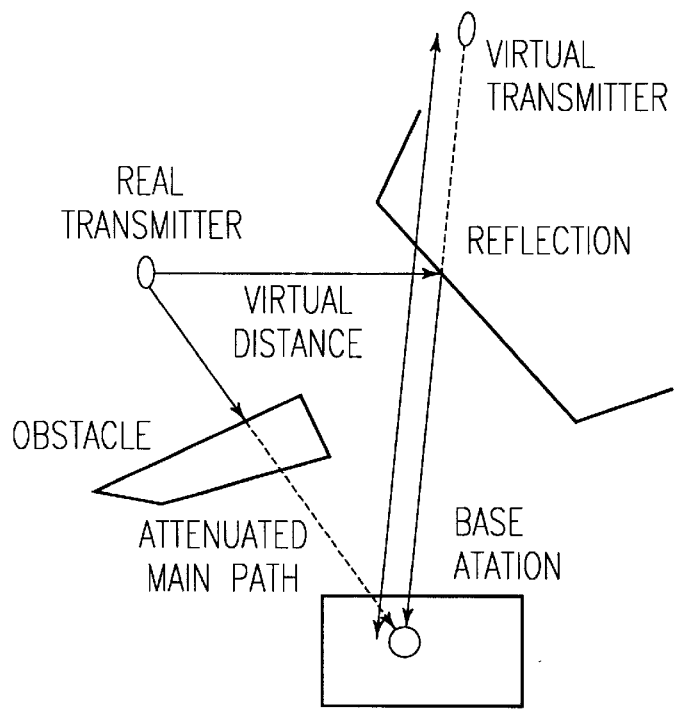
Figure 7:
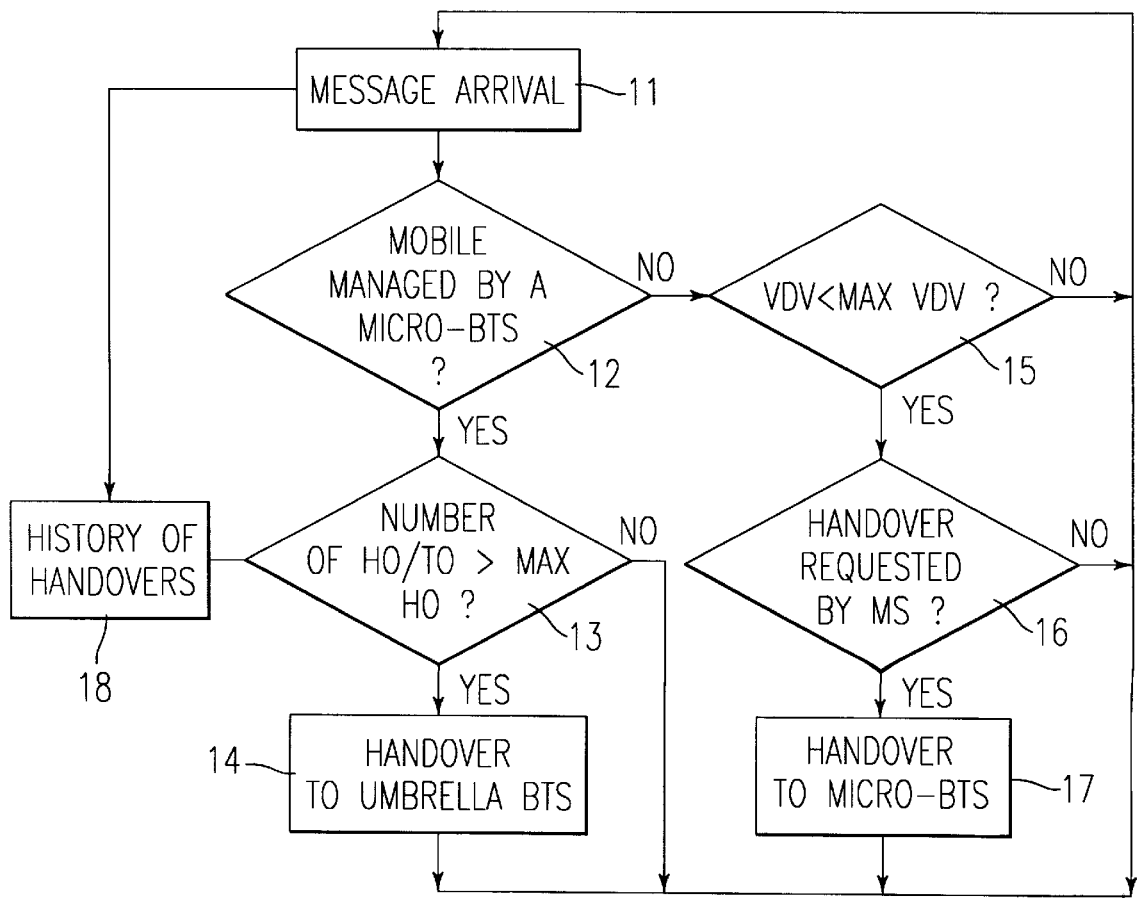

FIG. 6, an illustration of a propagation of a multipath radio wave between a mobile station and a base station;

FIG. 7, an algorithm in the form of a flow chart for allocating the management of the transfers of the communications of the mobile stations to the microcells or to the umbrella station.

DETAILED DESCRIPTION OF THE PREFERRED EMBODIMENTS

The cellular network structure which is represented in FIG. 1 comprises at least one umbrella macrocell 1 and a specified number of adjoining microcells 2 arranged inside the microcell 1.

The microcells as well as the umbrella macrocell comprise, arranged at their centre, a base station termed BTS, for transmitting radio waves whose transmission power and radiation pattern delimit the zones of territory which are occupied respectively by the microcells 2 and the umbrella cell 1. In a GSM network this structure defines a cellular communication network which makes it possible to set up digital communications between mobiles which are moving over the territory occupied by the various cells 1 and 2 of the network and subscribers of the switched public network. The communications are set up by virtue of a series of functions which are those required in any mobile radio communication network, namely dialling, the routing of the communications to the mobile users, the transferring of communications between cells when the mobiles leave the territory occupied by a cell and enter the territory of an adjacent cell etc. Conventionally these functions are grouped together in functional units represented in FIG. 2 and composed of mobile stations MS, of a radio subsystem BSS and of a management and routing subsystem NSS.

The mobile station MS allows the user to access the communication services offered. Each radio subsystem BSS caters for the communications over the whole of the territory delimited by a cells. Functionally, this system comprises a control function catered for by a base station controller BSC and a radio transmission function supported by the base stations BTS of each cell. These latter stations manage the radio links with the mobile stations MS. The relationships between a base station BTS and a base station controller BSC are defined by standardized interface circuits known by the name of "Abis". The base station controllers BSC are coupled to the remainder of the GSM network by interfaces denoted A.

The management and routing subsystem NSS is composed of three elements, a mobile service switch MSC responsible for the task of routing the communications destined for the mobiles within a cells, a database HLR for recording the permanent parameters of a subscriber and the location of its mobile station, a database VLR in which a finer location of the mobile stations in the call zone is recorded.

A typical configuration of dialogue between the stations MS, BTS and BSC is shown in FIG. 3. In this configuration the stations MS carry out a dialogue via the previously indicated interfaces by using standardized protocols. The adapting according to the invention of the GSM network of FIG. 3 to a network comprising microcells surrounded by umbrella macrocells is achieved by incorporating, in the manner represented in FIG. 4, into the base station BTS of each umbrella cell a direction finding station GS employing aerials situated at umimpeded spots above buildings. The base station controller BSC delegates it the task of managing the traffic inside the umbrella cell using a new "Ater" interface. The controller BSC is in touch via the "Abis" standardized interface with the base stations BTS of the microcells. The base stations BTS of the microcells, are as in the case of FIG. 3, responsible for the task of managing the mobile stations MS lying in their cell, provided however that they have a speed below a specified threshold. The mobile stations which have a greater speed will be managed directly by the base station BTS of the umbrella macrocell.

The detection of a speed of movement of a mobile station is performed either in a rough manner by counting within the macrocell, by means of the Abis interface, the number of transfers of communications between cells when the mobile station leaves the territory of a microcell and passes over to the territory of an adjacent microcell, i.e. more precisely by estimating the speed on the basis of a direction finding sighting performed by the radio direction finder of the umbrella station. A radio direction finder capable of performing this sighting can be the radio direction finder using the known antenna bearing the designation TRC 2966 and marketed by the Applicant. This radio direction finder comprises in the manner represented in FIG. 5, a multichannel reception assembly 3 coupled to an antenna array 4 by way of switching preamplifiers 9, associated with a channel gauging generator 10. The multichannel reception assembly 3 is synchronized with the BTS station so as to allow the angular locating of the mobile stations MS while benefiting from the best signal-to-noise ratio. The assembly 3 receives from the station BTS a synchronization pip enabling it to open reception windows wherein should lie the bursts of signals expected from the mobile stations;

a frequency control for positioning the multichannel receivers on the frequencies of the mobile stations;

an indicator for signalling each type of burst expected;

and a code for indicating the sequence number to be searched for in the case of a traffic burst.

On this basis a processor, not represented and belonging to the reception assembly 3 performs a search for synchronization with the bursts from sought-after mobile stations so as then to carry out direction finding on these bursts, so as to determine for each mobile station sought-after, the corresponding angle of arrival of the bursts of signals, the station BTS combines this information with the distance separating it from the umbrella base station so as to determine its speed of movement.

The search for synchronization is carried out in a known manner by correlating the reference sequence of each sought-after "burst" with the signal received over a horizontal corresponding to the uncertainty of reception of the GSM "bursts", this typically being 8.25 symbols. This search is performed conventionally in accordance with four steps. The first step consists in estimating the correlation matrix for the signals received on the N antennas of the array 4. Denoting by x(t) the vector of the complex envelopes of the signals received on the N antennas the correlation matrix $R_x$ can be written:

$$R_x = E[x(t) \cdot x(t)^+] \quad (1)$$

where E is a symbol which denotes mathematical expectation and $x(t)^+$ denotes the vector which is the conjugate transpose of x(t).

The second step consists in estimating a correlation vector Vxd(p) for a complex signal d representing the reference sequence of the burst of signals received with each vector X of the complex envelopes of signals received on the N antennas of the array 4 according to the relation:

$$Vxd(p) = \Sigma x(n+p) \cdot d(n) \quad (2)$$

where p represents the various possible positions of synchronization.

Estimation of the position of the synchronization is carried out according to a third step by calculating a vector V such that $$V = Vxd^* \cdot R_x^{-1} \cdot Vxd \quad (3)$$

where Vxd is the vector conjugate to Vxd.

Finally, the fourth step consists in searching for the maximum value of the estimate of the synchronization which most precisely positions the reception channels on the most favourable signal-to-noise ratio.

The determination of the angle of arrival of the bursts of signals can be carried out using various methods and in particular by using the algorithm known by the acronym MUSIC, this being the abbreviation of Multiple Signal Classification. A description of this algorithm can be found in particular by consulting the article by R. O. SCHMIDT entitled "Multiple Emitter Location and Signal parameter estimation system" published in the IEEE review of March 1986.

The algorithm breaks down into a calculation of a correlation matrix Rxx for the signals applied to the N antennas of the radio direction finder, to a diagonalization and a decomposition into eigenvectors of the matrix Rxx, and then into a detection of the minimum eigenvalues for determining the angle of arrival of the waves at the antenna array.

The determination of the distance is performed by determining the time of propagation of the radio wave between the mobile station and the base station of the umbrella macrocell.

Access to the GSM network is based on the principle of TDMA time-division multiplexing. To do this, the base station BTS which is in charge of the time allots a time window to each mobile station, during which the interrogated mobile station is supposed to respond. The start of the window is regarded as being the instant of arrival of the response from the mobile station when the latter is a distance of zero from the base station.

When the mobile station is far away from the base station, the response from the mobile station occurs at a later instant shifted with respect to the start of the window. This shift determines the distance which separates the mobile station MS from the base station BTS. This procedure which is dubbed "Timing advance" in the GSM standard serves to return to the mobile station MS the measured time shift so as to anticipate the transmission of the sequence of information bits by the duration of this shift so that the information which it transmits can be received in full within the time window allocated to it by the base station.

By performing for example these measurements at a rate of two measurements per second, it is possible to compensate for the time shift by the "Timing advance" procedure for speeds of movement of the mobile stations of up to 500 km/H.

Because of the fact that in an urban environment synchronization can be obtained on a path for propagating the radio waves by reflections on the facades of buildings, the base station controller BSC determines in this case a virtual distance DV represented in FIG. 6, this being defined from the time shift TA expressed as a number of symbols, through the relation $$DV = \frac{TA}{2}\left(\frac{48}{13}\right)10^{-6} \times 310 \qquad (4)$$

where $$\frac{48}{13}10^{-6}$$

represents the duration, in the GSM standard, of a GMSM modulation symbol.

A virtual position of the mobile station is determined in relation to the base station of the umbrella macrocell by combining the virtual distance with the virtual angle of arrival of the radiowave through the relations $$XY = DV \cos(AV) \qquad (5)$$

$$YV = DV \sin(AV) \qquad (6)$$

where AV denotes the virtual azimuth of the mobile station as determined by executing the previously described MUSIC algorithm.

These Cartesian position elements are associated with each mobile.

They are used and combined so as to deduce therefrom their speeds of virtual movement.

As indicated previously, the exact position of the mobile with respect to the base station of the umbrella macrocell may not be determined accurately on account of the presence in an urban environment of multiple reflectors which give rise to multipaths. Under these conditions only the distance which the mobile moves between two measurements appears to be sufficient. To obtain this path, the algorithm used consists in taking two successive virtual positions of the same mobile $XV_1$, $XV_2$, and $YV_1$ and $YV_2$ respectively to calculate its virtual speed of movement (VDV) through the relation:

$$VDV = \frac{\sqrt{(XV_1 - XV_2)^2 + (YV_1 - YV_2)^2}}{TI} \qquad (7)$$

where TI is the integration time which corresponds to the duration separating two measurements of distance of the same mobile.

This operation is carried out in the base station of the umbrella macrocell from the virtual azimuth information provided by direction finding.

The virtual movement speed information is transmitted to the base station controller of the macrocell with the aid of an "Afer" interface which has the same characteristics as the standardized "Abis" interface.

The management of the transfers between micro and umbrella cell is then determined as a function of the calculated speeds of virtual movement. This management is executed according to steps 11 to 18 of the flow chart of FIG. 7. Upon arrival of a message from a mobile station in communication, depicted in step 11, a test is carried out in step 12 to determine whether the mobile station MS is under the control of a base station of a microcell or of a base station of an umbrella cell. In the first case, step 13 checks the number of transfers into or "Handovers" Ho between microcells performed recently by the mobile station. If the rate Ho/To obtained during the observation time To is greater than a parameter with maximum value maxHo, then the controller of the base station BSC of the umbrella cell requests that the transfer be performed to the base station of the umbrella cell. In the contrary case the mobile station continues to be managed by the base microstations.

In the second case, step 15 checks that the measured speed of virtual movement is not greater than a specified threshold value.

If the speed is relatively low, the mobile station is authorized to perform a transfer to a BTS microstation, if it makes a request therefor in step 16.

What is claimed is:
1. Process for managing an intercellular transfer of communications from a mobile station in a cellular radio communication system including a specific number of microcells inside umbrella cells, wherein each of said microcells and each of said umbrella cells includes a base station for allowing a routing of said communications, comprising the steps of:
   counting a number of handovers $H_o$ of said mobile station between said microcells during a specified observation interval $T_o$ when said mobile station is under control of the base station of a microcell;
   calculating a rate of transfer $H_o/T_o$ for performing said intercellular transfer of communications to an umbrella station when said rate of transfer is greater than a specified threshold value when said mobile station is under a control of said base station of said microcell;
   maintaining said intercellular transfer of communications to said base station of said microcell when said rate of transfer is below said specified threshold value when said mobile station is under control of said base station of said microcell; and
   performing direction finding to measure a virtual speed of movement of said mobile station in relation to said base station of said umbrella cell in such a way as to perform said intercellular transfer of communications to said base station of said microcell when said virtual speed of movement measured by said direction finding is below a specified speed value when said mobile station is under control of said umbrella cell.

2. Process according to claim 1, wherein said mobile station communicates with said base station in accordance with GSM cellular radio communication network interfaces and protocols.

3. Process according to claim 1, further comprising the steps of:
performing said direction finding to pinpoint at least two successive virtual positions of said mobile station in relation to said base station of said umbrella cell so as to deduce therefrom said virtual speed of movement of said mobile station in a time interval which separates a pinpointing of said at least two successive virtual positions of said mobile station;
comparing said virtual speed of movement with said specified speed value so as to manage said communications of said mobile station at said base station of said umbrella cell in which said mobile station lies when said virtual speed of movement of said mobile station is greater than said specified speed value; and
comparing said virtual speed of movement with said specified speed value so as to transfer management of said communications of said mobile station from said base station of said umbrella cell in which said mobile station lies to said base station of said microcell when said virtual speed of movement of said mobile station is less than or equal to said specified speed value.

4. Process according to claim 3, further comprising the step of pinpointing said at least two successive positions of said mobile station in terms of azimuth and distance.

5. Process according to claim 4, wherein azimuthal pinpointing is performed with aid of a multichannel radio direction finder by determining an angle of arrival of electromagnetic waves transmitting electromagnetic signals from said mobile station.

6. Process according to claim 5, further comprising the step of synchronizing said multichannel radio direction finder to said base station of said umbrella cell so as to allow angular locating of said mobile station with a best signal-to-noise ratio.

7. Process according to claim 6, further comprising the step of determining a distance separating said mobile station from said base station of said umbrella cell by measuring, in said base station, a time of propagation of radio waves between said mobile station and said base station.

8. Process according to claim 6, wherein said mobile station communicates with said base station in accordance with GSM cellular radio communication network interfaces and protocols.

9. Process according to claim 5, further comprising the step of determining a distance separating said mobile station from said base station of said umbrella cell by measuring, in said base station, a time of propagation of radio waves between said mobile station and said base station.

10. Process according to claim 5, wherein said mobile station communicates with said base station in accordance with GSM cellular radio communication network interfaces and protocols.

11. Process according to claim 4, further comprising the step of determining a distance separating said mobile station from said base station of said umbrella cell by measuring, in said base station, a time of propagation of radio waves between said mobile station and said base station.

12. Process according to claim 4, wherein said mobile station communicates with said base station in accordance with GSM cellular radio communication network interfaces and protocols.

13. Process according to claim 3, further comprising the step of determining a distance separating said mobile station from said base station of said umbrella cell by measuring, in said base station, a time of propagation of radio waves between said mobile station and said base station.

14. Process according to claim 13, wherein said mobile station communicates with said base station in accordance with GSM cellular radio communication network interfaces and protocols.

15. Process according to claim 3, wherein said mobile station communicates with said base station in accordance with GSM cellular radio communication network interfaces and protocols.

* * * * *